US012108505B2

(12) United States Patent
Lin et al.

(10) Patent No.: US 12,108,505 B2
(45) Date of Patent: Oct. 1, 2024

(54) WORK MODE INDICATOR AND POWER CONVERTER FOR LAMP

(71) Applicant: Changzhou Jutai Electronic Co., Ltd., Jiangsu (CN)

(72) Inventors: Jun Lin, Jiangsu (CN); Chengqian Pan, Jiangsu (CN); Bin Chen, Jiangsu (CN)

(73) Assignee: Changzhou Jutai Electronic Co., Ltd., Changzhou (CN)

( * ) Notice: Subject to any disclaimer, the term of this patent is extended or adjusted under 35 U.S.C. 154(b) by 0 days.

(21) Appl. No.: 18/140,462

(22) Filed: Apr. 27, 2023

(65) Prior Publication Data

US 2024/0172341 A1 May 23, 2024

(30) Foreign Application Priority Data

Nov. 23, 2022 (CN) ........................ 202223106661.1

(51) Int. Cl.

*H05B 45/20* (2020.01)
*H01R 13/52* (2006.01)
*H01R 13/717* (2006.01)
*H01R 31/06* (2006.01)
*H05B 45/325* (2020.01)
*H05B 47/12* (2020.01)

(52) U.S. Cl.

CPC ......... *H05B 45/20* (2020.01); *H01R 13/5202* (2013.01); *H01R 13/7175* (2013.01); *H01R 31/065* (2013.01); *H05B 45/325* (2020.01); *H05B 47/12* (2020.01)

(58) Field of Classification Search

CPC ...... H05B 45/20; H05B 45/30; H05B 45/325; H05B 47/10; H05B 47/12; H01R 13/5202; H01R 13/7175; H01R 31/065

See application file for complete search history.

(56) References Cited

U.S. PATENT DOCUMENTS

2017/0280533 A1* 9/2017 Dimberg .................. G01D 5/34
2022/0322506 A1* 10/2022 Ray ........................ H05B 45/10
2023/0345599 A1* 10/2023 Yang ...................... H05B 45/20

FOREIGN PATENT DOCUMENTS

CN 216414636 U * 4/2022
CN 216959842 U * 7/2022

* cited by examiner

*Primary Examiner* — Jimmy T Vu

(57) ABSTRACT

The present disclosure relates to A work mode indicator for a lamp, including: a user command switch unit configured to issue a switch command to switch a work mode; a controller configured to output a work mode indication control signal, the controller being electrically connected to the user command switch unit; and a work mode indication unit; wherein the work mode indication unit is a multicolor light-emitting indicator lamp configured to emit multiple colors of light to indicate different work modes, and the controller has an output end electrically connected to the multicolor light-emitting indicator lamp. With the present disclosure, different work modes of the lamp may be indicated through a multicolor light-emitting indicator lamp, whereby a user can determine which work mode the lamp is in.

8 Claims, 9 Drawing Sheets

WORK MODE INDICATOR AND POWER CONVERTER FOR LAMP

CROSS-REFERENCE TO RELATED APPLICATION

This application claims priority from the Chinese patent application 2022231066611 filed Nov. 23, 2022, the content of which is incorporated herein in the entirety by reference.

TECHNICAL FIELD

The present disclosure relates to a work mode indicator and a power converter for a lamp.

BACKGROUND

LED lamps have very wide market and application prospects, with advantages of high illumination efficiency, long service life, low driving voltage, quick response speed and low power consumption. With the development of science and technology, LED illumination is gradually replacing traditional filament lamps due to its advantages of energy conservation, long service life, colorful lighting and the like. In addition, there is also increasing research on LED lighting equipment both domestically and abroad. With the development of the LED illumination field, people are more and more inclined to intelligent illumination equipment.

For example, LED lamp strings used during festivals, which usually are wound around a tree or column, or arranged in other forms. Since the LED lamp string has a low working voltage, a power converter is needed to covert a high-voltage alternating current into a 5V low voltage to supply to the LED lamp string In the prior art, there have been patents which disclosed the above power converter. The power converter, besides supplying power, also plays a role of controlling a work mode of the LED lamp string. For example, by outputting control signals of different duty ratios, the flickering speed and frequency and the like of the LED lamp string are controlled.

The above power converter generally has a function of controlling the LED lamp string to operate in a timing manner. For example, after the timing mode is enabled, the LED lamp string is controlled to light off during daytime and light on during nighttime. To facilitate people to identify the timing work mode, one timing indicator lamp is arranged inside the existing power converters, generally, it is one light-emitting diode (LED). When the timing mode is enabled, the indicator lamp is on; when the timing mode is disabled, the indicator lamp is off.

However, with the function diversification of the power converter, a single-function timing indicator lamp cannot meet the requirements of users when indicating whether it is in a timing work mode. For example, some users point out that there are several timing modes after the timing work mode is enabled. For example, a first mode: 18 hours On and 6 hours Off; a second mode: 16 hours On and 8 hours Off; a third mode: 6 hours On, 6 hours Off, 3 hours On and 9 hours Off. Obviously, in the multiple timing modes, when observing the timing indicator lamp, the user just knows it is in a timing work mode. The LED that emits one color of light cannot allow the user to distinguish which timing mode is selected. Thus, the existing structures have deficiencies that could confuse the users.

SUMMARY

The present disclosure aims to provide a work mode indicator and a power converter for a lamp. With the present disclosure, different work modes of the lamp may be indicated through a multicolor light-emitting indicator lamp, whereby a user can determine which work mode the lamp is in.

A work mode indicator for a lamp, comprising: a user command switch unit configured to issue a switch command to switch a work mode; a controller configured to output a work mode indication control signal, the controller being electrically connected to the user command switch unit; and a work mode indication unit; wherein the work mode indication unit is a multicolor light-emitting indicator lamp configured to emit multiple colors of light to indicate different work modes, and the controller has an output end electrically connected to the multicolor light-emitting indicator lamp.

The work mode of the lamp may be selected through a user command switch unit. The work mode of the lamp generally includes a standby mode, a lighting work mode and a timing work mode. In the standby mode, the multicolor light-emitting indicator lamp emits a light of color D1. In the lighting work mode, the multicolor light-emitting indicator lamp emits a light of color D2. After entering the timing work mode, since there are multiple timing modes, the multicolor light-emitting indicator lamp emits a light of color D3 to indicate a first timing mode when entering the timing work mode at first. When switching a timing mode in the timing work mode, the multicolor light-emitting indicator lamp emits a light of color D4 to indicate a second timing mode, and the multicolor light-emitting indicator lamp emits a light of color D5 to indicate a third timing mode. With the present disclosure, different work modes of the lamp may be indicated through a multicolor light-emitting indicator lamp, whereby a user can determine which work mode the lamp is in.

DETAILED DESCRIPTION OF THE EMBODIMENTS

Embodiment 1

Figure 1:
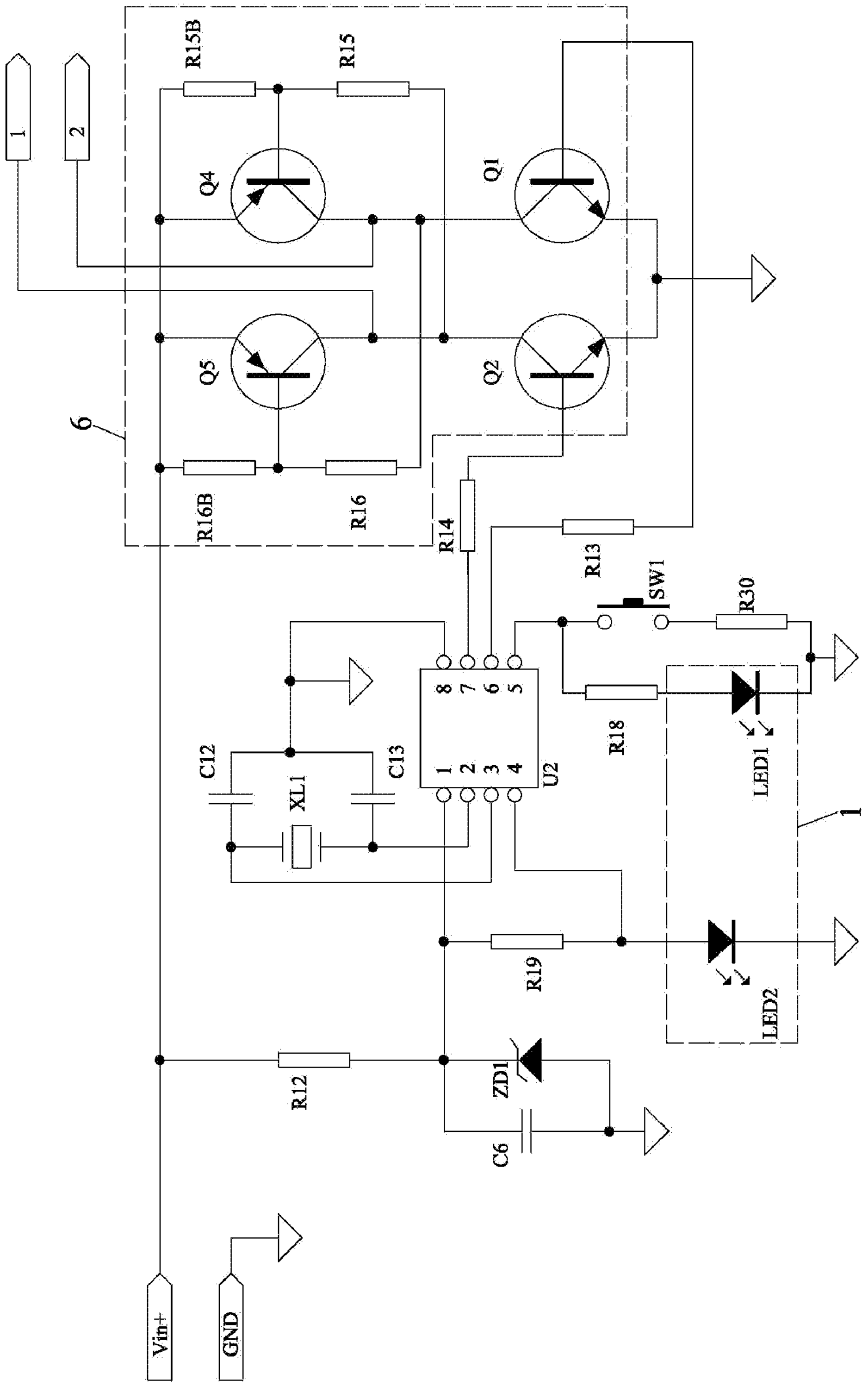
FIG. 1 is a circuit diagram of an indicator of a first work mode.

As shown in FIG. 1, a work mode indicator for a lamp provided by the present disclosure includes a user command switch unit, a controller U2 and a work mode indication unit. Herein below are described in detail each part and the relationship between each part.

The user command switch unit is configured to issue a switch command to switch a work mode. The controller U2 is configured to output a work mode indication control signal, and the controller U2 is electrically connected to the user command switch unit. By means of a work mode switch command sent to the controller U2 by the user command switch unit, the work mode of the lamp may be selected.

As shown in FIG. 1, in the present embodiment, the user command switch unit preferably employs a changeover switch SW1, the controller U2 preferably employs a programmable single-chip. Different work mode switch commands may be provided to the controller U2 by detecting a conduction time of the changeover switch SW1 or a number of times of pressing within a specified time. For example:

As shown in FIG. 1, leave the changeover switch SW1 conducted for 3 consecutive seconds, then the controller U2 outputs a command signal to allow the lamp into a timing work mode. After entering the timing work mode, a default first timing mode is enabled at first, that is, a timing mode of 18 hours ON and 6 hours Off. In the timing work mode, press the changeover switch SW1 for two consecutive times within 1 second to switch into another timing work mode. For example, in the default first timing mode, press the changeover switch SW1 for two consecutive times within 1 second to switch into a second timing work mode, that is, 16 hours ON and 8 hours Off. Through such operations, switch may be carried out between multiple timing modes. If to exit the timing mode, just leave the changeover switch SW1 conducted for 3 consecutive seconds again.

As shown in FIG. 1, the work mode indication unit is a multicolor light-emitting indicator lamp 1 configured to emit multiple colors of light to indicate different work modes, and the controller U2 has an output end electrically connected to the multicolor light-emitting indicator lamp 1. In the present embodiment, for different work modes, the controller U2 outputs different work mode indication control signals to the multicolor light-emitting indicator lamp 1, so that the multicolor light-emitting indicator lamp 1 emits different colors of light.

As shown in FIG. 1, the work mode of the lamp generally includes a standby mode, a lighting work mode (in which mode, the LED lamp string is enabled to have multiple modes of lighting), and a timing work mode. For example, in the standby mode, the multicolor light-emitting indicator lamp 1 emits a light of color D1. In the lighting work mode, the multicolor light-emitting indicator lamp 1 emits a light of color D2. In the lighting work mode, there are multiple modes to light. Since the LED lamp string has already lighted, it is possible to identify which lighting mode is in use through the lighting status of the LED lamp string. Therefore, it is no longer necessary to indicate the lighting mode of the LED lamp string through the multicolor light-emitting indicator lamp 1. After entering the timing work mode, since there are multiple timing modes, the multicolor light-emitting indicator lamp 1 emits a light of color D3 to indicate a first timing mode when entering the timing work mode at first. When switching a timing mode in the timing work mode, the multicolor light-emitting indicator lamp 1 emits a light of color D4 to indicate a second timing mode, and the multicolor light-emitting indicator lamp 1 emits a light of color D5 to indicate a third timing mode. When the multicolor light-emitting indicator lamp 1 emits a light of color D1 or D2, it means the lamp has exited the timing work mode. Through the above description, the multicolor light-emitting indicator lamp 1 not only can indicate the multiple work modes, but also can indicate the specific timing modes.

As shown in FIG. 1, the work mode indication control signal output by the controller 2 is a PWM signal, the multicolor light-emitting indicator lamp 1 is a light-emitting hybrid encapsulated component, and the output end of the controller 2 is electrically connected to the light-emitting hybrid encapsulated component.

As shown in FIG. 1, the light-emitting hybrid encapsulated component includes a first Light-emitting diode LED1 and a second Light-emitting diode LED2. The first Light-emitting diode LED1 has an anode terminal electrically connected to a first output end of the controller U2; the second Light-emitting diode LED2 has an anode terminal electrically connected to a second output end of the controller U2; the second Light-emitting diode LED2 is encapsulated into one piece with the first Light-emitting diode LED1; and cathode terminals of the first Light-emitting diode LED1 and the second Light-emitting diode LED2 are connected.

As shown in FIG. 1, the PWM signal output by the controller U2 is employed to control a duty ratio of the first Light-emitting diode LED1 to the second Light-emitting diode LED2, so that the first Light-emitting diode LED1 or the second Light-emitting diode LED2 emits light separately, or the first Light-emitting diode LED1 and the second Light-emitting diode LED2 emit light at the same time. A mixed light is generated when they emit light at the same time. Since the duty ratio is different, the generated mixed light is of different colors, thereby obtaining the above D1 to D5 colors.

As shown in FIG. 1, the work mode indicator further includes a current limit resistor R18, the anode terminal of the first Light-emitting diode LED1 is electrically connected to the first output end of the controller U2 through the current limit resistor R18; the cathode terminal of the first Light-emitting diode LED1 and the cathode terminal of the second Light-emitting diode LED2 are grounded.

Embodiment 2

Figure 2:
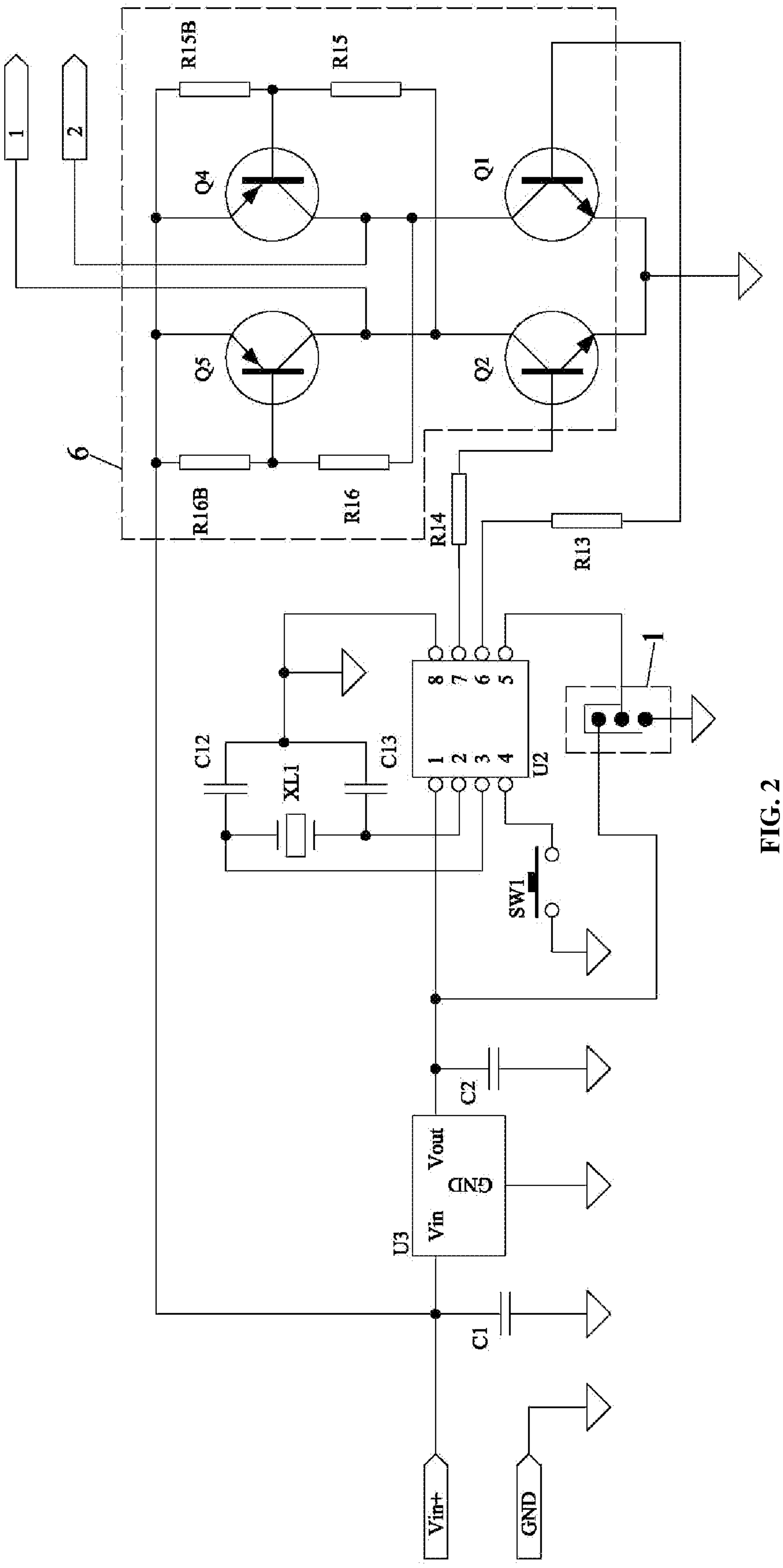
FIG. 2 is a circuit diagram of an indicator of a second work mode.

As shown in FIG. 2, the present embodiment is different from the Embodiment 1 in that: the work mode indication control signal output by the controller U2 is a coded signal, the multicolor light-emitting indicator lamp 1 is a coded light-emitting module, and the controller U2 is electrically connected to the coded light-emitting module. When the controller U2 receives a work mode switch command input from the user command switch unit, the controller U2 outputs a coded signal and provides it to the coded light-emitting module, then the coded light-emitting module parses the coded signal.

As shown in FIG. 2, the coded light-emitting module includes a control chip and a light-emitting hybrid encapsulated component. The control chip is configured to output a PWM signal according to a coded signal, the control chip is electrically connected to the controller U2, the light-emitting hybrid encapsulated component is electrically connected to an output end of the control chip, the light-emitting hybrid encapsulated component is composed of multiple light-emitting diodes that emit different colors of light, and these light-emitting diodes are encapsulated into one piece with the control chip.

As shown in FIG. 2, the control chip parses the coded signal and then outputs a PWM signal. Each code corresponds to one PWM signal. The control chip is inbuilt with multiple light-emitting control programs. After parsing the coded signal, the control chip calls a light-emitting control program matched with the coded signal to control the duty ratio of the multiple light-emitting diodes inside the light-emitting hybrid encapsulated component, so that the light-emitting hybrid encapsulated component emits different colors of light.

As shown in FIG. 2, there are three light-emitting diodes that emit different colors of light. A first one can emit red light separately, a second one can emit green light separately, and a third one can emit blue light separately. By controlling different duty ratios of each light-emitting diode, the light-emitting hybrid encapsulated component can emit different colors of light.

Embodiment 3

The present embodiment is different from the Embodiment 1 in that: the user command switch unit employs a radio signal receiving module. The radio signal receiving module may be an infrared signal receiving module, a Bluetooth receiving module, a WIFI receiving module, etc. A work mode switch command is sent to the radio signal receiving module through a radio signal transmitting module. For example, a work mode switch command is sent to the infrared signal receiving module through an infrared signal remote controller, or a work mode switch command is sent to the Bluetooth receiving module through a Bluetooth device, or a work mode switch command is sent to the WIFI receiving module through a WIFI device. The infrared signal remote controller and/or the Bluetooth device and/or the WIFI device may be integrated into a mobile device, for example, a smart phone.

A power converter A for a lamp may be obtained by application of any one of the work mode indicators for the lamp in the above Embodiment 1 to Embodiment 3. Below are described specific embodiments of several power converters A for lamps.

Embodiment 1 of a Power Converter A for a Lamp

As shown in FIG. 3 to FIG. 15, a power converter A for a lamp includes a shell 2, a PCB board 3, a waterproof component 4 and a work mode indicator for the lamp. The PCB board 3 is positioned inside the shell 2, the shell 2 is formed with a hole, and the waterproof component 4 is mated with the hole. The user command switch unit, the controller U2 and the multicolor light-emitting indicator lamp in the work mode indicator are all arranged on the PCB board 3, for example, they are fixed onto the PCB board 3 through welding. The waterproof component 4 is made of a transparent material. The waterproof component 4 preferably employs silicone. Since the user command switch unit is a changeover switch SW1 and/or a radio signal receiving module, in the present embodiment the multicolor light-emitting indicator lamp 1 and the changeover switch SW1 are mated with the waterproof component 4 respectively.

Figure 3:
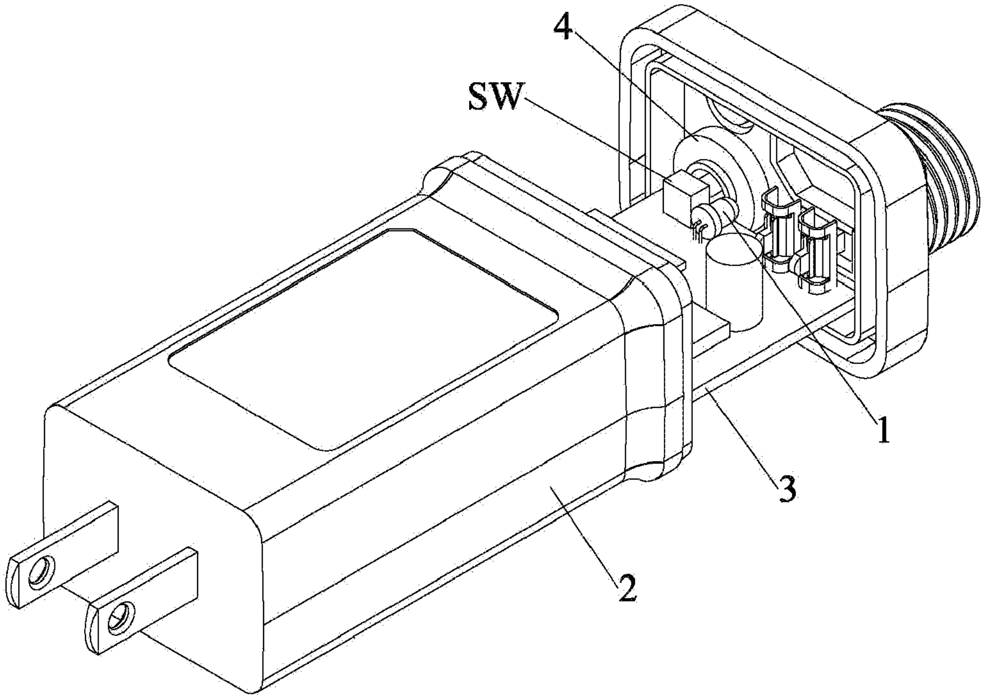
FIG. 3 is an exploded view of a power converter formed by assembling a work mode indicator for a lamp according to the present disclosure and a circuit board and a shell.
Figure 4:
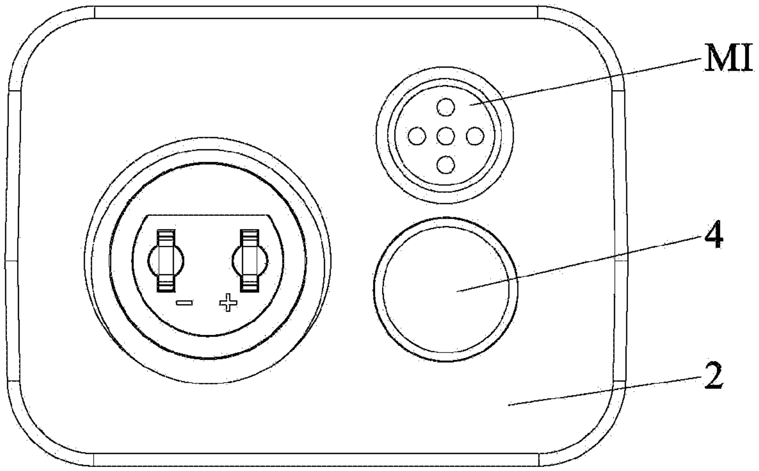
FIG. 4 is a rear view of the power converter shown in FIG. 3.
Figure 5:
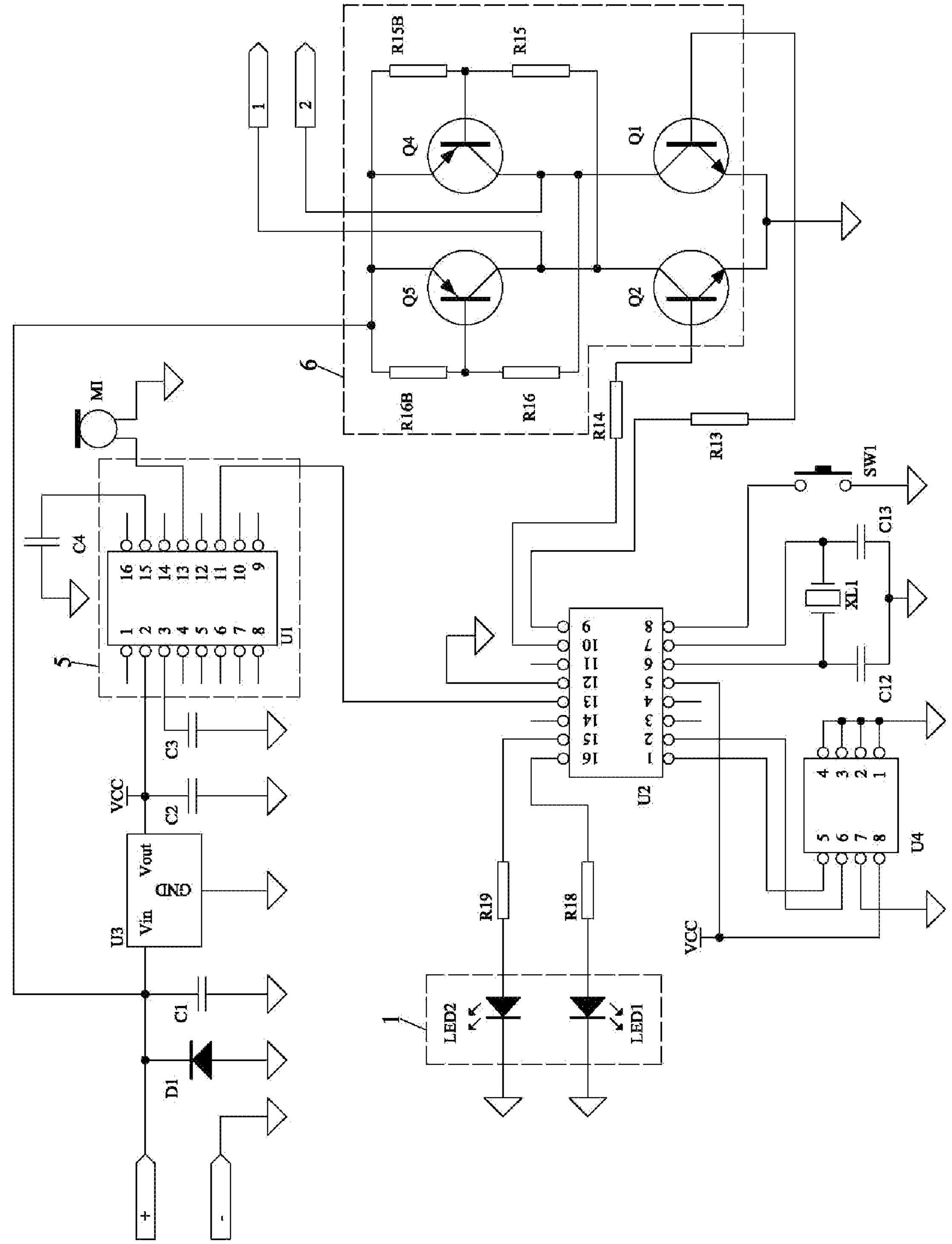
FIG. 5 is a circuit diagram of an indicator of a third work mode which is arranged inside a power converter.
Figure 6:
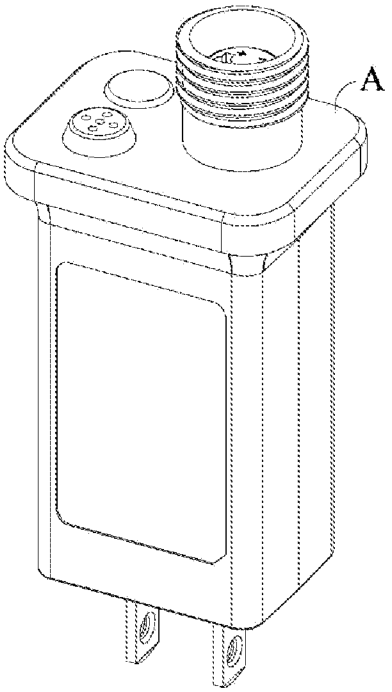
FIG. 6 is a diagram of a first American standard power converter acquired after the application of the present disclosure.
Figure 7:
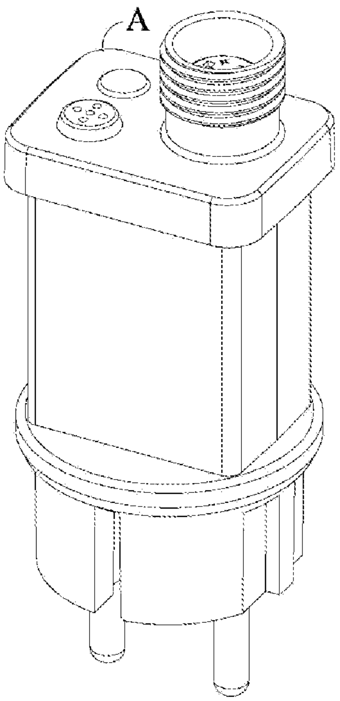
FIG. 7 is a diagram of a first European standard power converter acquired after the application of the present disclosure.
Figure 8:
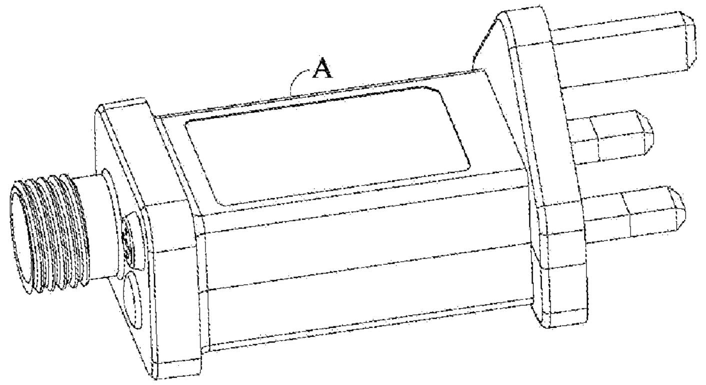
FIG. 8 is a diagram of a first British standard power converter acquired after the application of the present disclosure.
Figure 9:
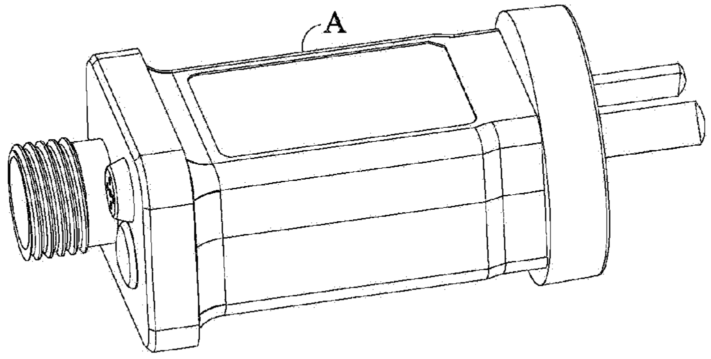
FIG. 9 is a diagram of a first Australian standard power converter acquired after the application of the present disclosure.
Figure 10:
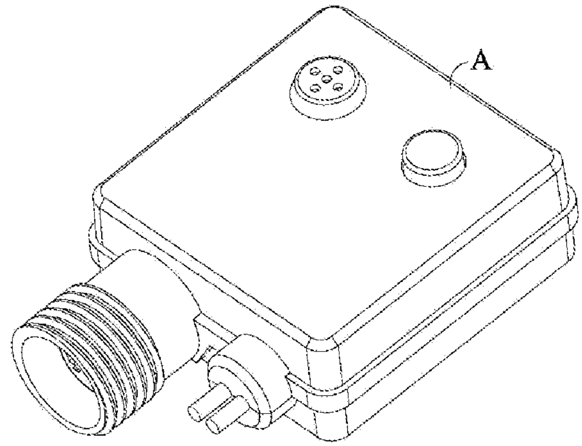
FIG. 10 is a diagram of a first separate power converter acquired after the application of the present disclosure.
Figure 11:
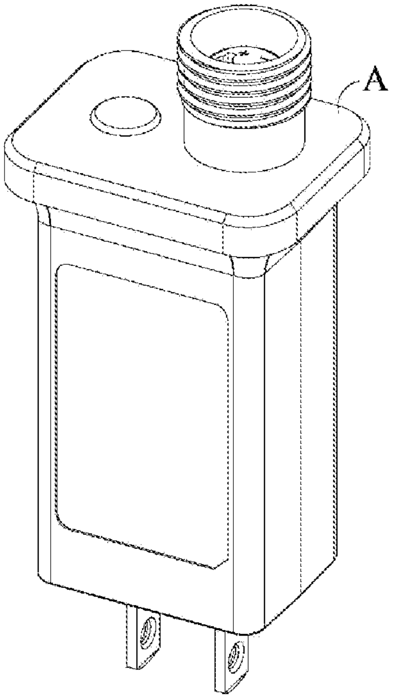
FIG. 11 is a diagram of a second American standard power converter acquired after the application of the present disclosure.
Figure 12:
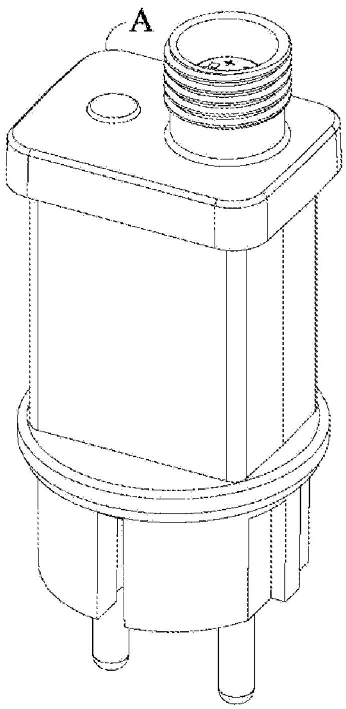
FIG. 12 is a diagram of a second European standard power converter acquired after the application of the present disclosure.
Figure 13:
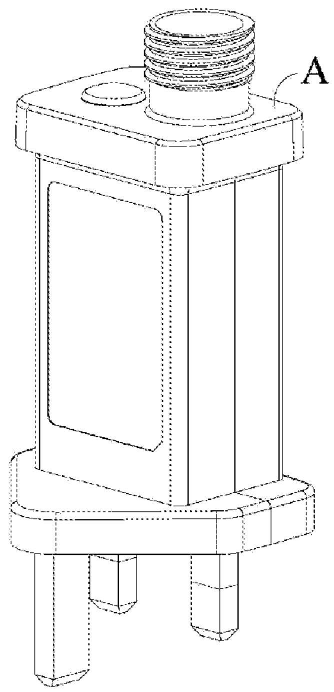
FIG. 13 is a diagram of a second British standard power converter acquired after the application of the present disclosure.
Figure 14:
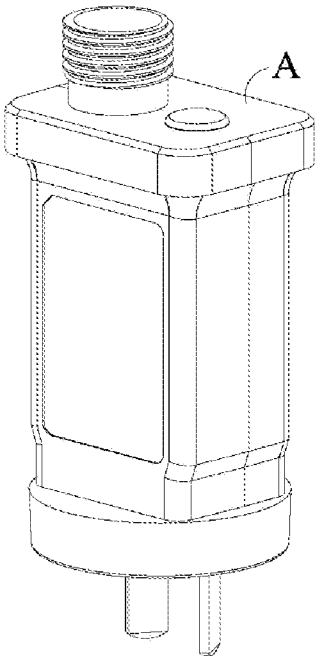
FIG. 14 is a diagram of a second Australian standard power converter acquired after the application of the present disclosure.
Figure 15:
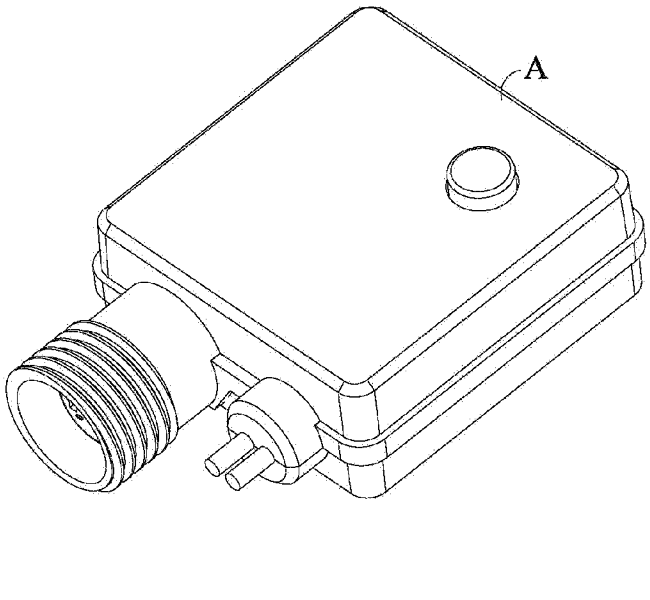
FIG. 15 is a diagram of a second separate power converter acquired after the application of the present disclosure.

As shown in FIG. 3 to FIG. 5, in the present embodiment, by means of the transparency of the waterproof component 4, the light emitted by the multicolor light-emitting indicator lamp 1 can pass through the waterproof component 4, so that a user can observe the lighting color of the multicolor light-emitting indicator lamp 1 and then determine the current work mode of the power converter A. In addition, the changeover switch SW1 is mated with the waterproof component 4; if a pressure is applied to the waterproof component 4, the waterproof component 4 will transfer the pressure to the changeover switch SW1, so that the changeover switch SW1 sends a work mode switch command to the controller U2. The waterproof component 4 achieves multiple functions.

As shown in FIG. 3 to FIG. 5, the user command switch unit further includes a microphone MI configured to acquire a user voice switch command. The power converter A further includes an offline voice recognition unit 5. The offline voice recognition unit 5 has an input end electrically connected to the microphone MI. After directly parsing a voice switch command provided by the microphone MI, the offline voice recognition unit 5 outputs a work mode control command matched with the input voice switch command. The controller U2 is electrically connected to an output end of the offline voice recognition unit 5 to acquire the work mode control command. The switch SW1 is further configured to switch between a manual control mode and a voice control mode.

The microphone MI may be installed on the shell 2 (as shown in FIG. 4). A small hole is formed on the shell 2, and voice is transmitted to the microphone MI through the small hole. Sealing adhesive is provided between the microphone MI and the shell 2, to prevent water entering the shell. In addition, the microphone MI may also be installed on the circuit board, and the small hole formed on the shell 2 is not sealed by sealing adhesive. Such structure is applicable to indoor use.

As shown in FIG. 3 to FIG. 5, the microphone MI is configured to acquire a user voice switch command. The user voice switch command is to switch the work modes of the lamp, including On/Off, brightness, color (red light, white light, green light, etc.), flickering frequency, lamp on timing and lamp off timing.

As shown in FIG. 3 to FIG. 5, the input end of the offline voice recognition unit 5 is electrically connected to the microphone MI. The offline voice recognition unit 5 may be electrically connected to the microphone MI through a wired or wireless mode. The wired mode employs welding, and the wireless mode employs Bluetooth or WIFI, etc.

As shown in FIG. 3 to FIG. 5, after directly parsing the voice switch command provided by the microphone MI, the offline voice recognition unit 5 outputs a work mode control command matched with the input voice switch command. The offline voice recognition unit 5 is capable of recognizing voice without accessing a network.

As shown in FIG. 3 to FIG. 5, in the present embodiment, the offline voice recognition unit 5 includes: an offline voice recognition chip U1 electrically connected to the microphone MI. The offline voice recognition chip U1 is configured to parse a voice switch command and output a command signal. The controller U2 is electrically connected to the offline voice recognition chip U1, and the controller U2 generates a work mode control command after parsing the command signal provided by the offline voice recognition chip U1.

As shown in FIG. 3 to FIG. 5, the work mode control command is configured to control a standby switch mode, a lighting work mode and a timing work mode of the lamp. The standby switch mode is to control the lamp to enter or exit the standby mode. The lighting work mode includes the brightness, color, flickering mode, flickering frequency and the like of the lamp. The timing work mode includes lamp on timing, lamp off timing and settings of different timing lengths.

As shown in FIG. 3 to FIG. 5, the offline voice recognition chip U1 is inbuilt with a voice parsing program. The command signal output by the offline voice recognition chip U1 after parsing a voice is a string of codes. Different codes are indicative of different work modes. The controller U2 has stored therein multiple control programs. After receiving a corresponding code, the controller U2 calls a control program matched with the code, so that the control program generates a work mode control command.

For example, a voice switch command issued by a user is to allow the LED lamp string to light with the highest brightness, the microphone MI acquires a command to emit red light and then transmits the command to the offline voice recognition chip U1. The offline voice recognition chip U1 parses the voice switch command to light with the highest brightness and then generates a code 001. The controller U2 calls a first subprogram matched with 001 after receiving the code 001, thus outputting a control command to light with the highest brightness to a drive circuit 6.

As shown in FIG. 3 to FIG. 5, the drive circuit 6 is electrically connected to the output end of the offline voice recognition unit 5 to acquire the work mode control command. In the present embodiment, the first output end of the controller U2 is connected to the drive circuit 6 through a thirteenth resistor R13, and the second output end of the controller U2 is connected to the drive circuit 6 through a fourteenth resistor R14.

The structure of the drive circuit 6 is of existing technologies, and no further description is repeated here. The work mode control command output by the offline voice recognition unit 5 is mainly to control the duty ratio of each transistor in the drive circuit 6, thereby changing the brightness, color, flickering frequency and the like of the lamp.

As shown in FIG. 3 to FIG. 5, after the offline voice recognition unit 5 is added into the power converter A, the power converter A may be switched between the manual control mode and the voice control mode through the changeover switch SW1 and the radio signal receiving module. For example, press the changeover switch SW1 for three times within one second to enter the voice control mode from the manual control mode; or, press the changeover switch SW1 for three times within one second to enter the manual control mode from the voice control mode; or a command to enter the voice control mode is transmitted to the radio signal receiving module through the radio signal transmitting module.

As shown in FIG. 3 to FIG. 5, when the power converter A enters the voice control mode, the multicolor light-emitting indicator lamp 1 emits a light of color D6. When a user issues a command to enter the voice control mode, if the multicolor light-emitting indicator lamp 1 emits a light of color D6, it is indicated that the power converter A enters the voice control mode successfully; otherwise, it fails.

As shown in FIG. 3 to FIG. 5, the power converter A further includes a third capacitor C3 configured to filter a power signal. The third capacitor C3 is electrically connected to the offline voice recognition unit 5. In the present embodiment, third capacitor C3 is electrically connected to the offline voice recognition chip U1. The offline voice recognition chip U1 totally includes sixteen pins, among which a second pin is a power input pin. The offline voice recognition chip U1 is internally provided with a regulator circuit, which is grounded through a third pin and the third capacitor C3. The third capacitor C3 is configured to filter a power signal of the regulator circuit.

As shown in FIG. 3 to FIG. 5, an eleventh pin of the offline voice recognition chip U1 is a command signal output pin. The eleventh pin of the offline voice recognition chip U1 is connected to a signal input end of the controller U2, that is, connected to a fourth pin of the controller U2.

As shown in FIG. 3 to FIG. 5, the present embodiment further includes a fourth capacitor C4. The fourth capacitor C4 is electrically connected to the offline voice recognition chip U1. The offline voice recognition chip U1 is internally provided with a power source configured to supply power to the microphone MI. The fourth capacitor C4 is configured to filter the power supplied to the microphone MI.

As shown in FIG. 3 to FIG. 5, the present embodiment further includes a power source. The power source is electrically connected to the offline voice recognition unit 5. The power source includes: a three terminal regulator U3, a first capacitor C1 and a second capacitor C2. The first capacitor C1 is connected to a power input end of the three terminal regulator U3. The second capacitor C2 is connected to a power output end of the three terminal regulator U3. In the present embodiment, the power supplied to the three terminal regulator U3 is a direct current. For example, a 12V direct current is transmitted to the three terminal regulator U3, the input direct current is filtered by the first capacitor C1, and the output 5V direct current is filtered by the second capacitor C2.

As shown in FIG. 3 to FIG. 5, the present embodiment further includes an anti-reverse diode D1. The anti-reverse diode D1 has a cathode terminal connected to an input end of the power source and has an anode terminal grounded.

Embodiment 2 of a Power Converter A for a Lamp

The present embodiment is different from the Embodiment 1 in that: the shell 2 is provided with a transparent area, the user command switch unit is mated with the waterproof component 4, and the multicolor light-emitting indicator lamp 1 is mated with the transparent area.

Embodiment 3 of a Power Converter A for a Lamp

The present embodiment is different from the Embodiment 1 in that: the shell 2 is provided with a transparent area, the user command switch unit is a radio signal receiving module, the multicolor light-emitting indicator lamp 1 and the radio signal receiving module are mated with the transparent area respectively.

What is claimed is:

1. A work mode indicator for a lamp, comprising:

a user command switch unit configured to issue a switch command to switch a work mode;

a controller (U2) configured to output a work mode indication control signal, the controller (U2) being electrically connected to the user command switch unit; and a work mode indication unit; wherein the work mode indication unit is a multicolor light-emitting indicator lamp (1) configured to emit multiple colors of light to indicate different work modes, and the controller (U2) has an output end electrically connected to the multicolor light-emitting indicator lamp (1);

wherein the work mode indication control signal output by the controller (2) is a PWM signal, the multicolor light-emitting indicator lamp (1) is a light-emitting hybrid encapsulated component, and the output end of the controller (2) is electrically connected to the light-emitting hybrid encapsulated component;

wherein the light-emitting hybrid encapsulated component comprises:

a first light-emitting diode (LED1) having an anode terminal electrically connected to a first output end of the controller (U2); and a second light-emitting diode (LED2) having an anode terminal electrically connected to a second output end of the controller (U2); the second light-emitting diode (LED2) being encapsulated into one piece with the first light-emitting diode (LED1); and cathode terminals of the first light-emitting diode (LED1) and the second light-emitting diode (LED2) being connected.

2. The work mode indicator for the lamp according to claim 1, wherein the work mode indication control signal output by the controller (2) is a coded signal, the multicolor light-emitting indicator lamp (1) is a coded light-emitting module, and the controller (U2) is electrically connected to the coded light-emitting module.

3. The work mode indicator for the lamp according to claim 2, wherein the coded light-emitting module comprises: a control chip configured to output a PWM signal according to a coded signal, the control chip being electrically connected to the controller (U2); and a light-emitting hybrid encapsulated component electrically connected to an output end of the control chip, the light-emitting hybrid encapsulated component being composed of multiple light-emitting diodes that emit different colors of light, and these light-emitting diodes being encapsulated into one piece with the control chip.

4. A power converter for a lamp, comprising a shell (2), a PCB board (3) and a waterproof component (4), the PCB board (3) being positioned inside the shell (2), the shell (2) being formed with a hole, and the waterproof component (4) being mated with the hole, wherein the power converter further comprises the work mode indicator for the lamp according to claim 1, the user command switch unit, the controller (U2) and the multicolor light-emitting indicator lamp in the work mode indicator are all arranged on the PCB board (3), the waterproof component (4) is made of a transparent material, the user command switch unit is a changeover switch (SW1) and/or a radio signal receiving module, the multicolor light-emitting indicator lamp (1) and the changeover switch (SW1) are mated with the waterproof component (4) respectively, wherein the work mode indication control signal output by the controller (2) is a PWM signal, the multicolor light-emitting indicator lamp (1) is a light-emitting hybrid encapsulated component, and the output end of the controller (2) is electrically connected to the light-emitting hybrid encapsulated component; and wherein the light-emitting hybrid encapsulated component comprises:

a first light-emitting diode (LED1) having an anode terminal electrically connected to a first output end of the controller (U2); and a second light-emitting diode (LED2) having an anode terminal electrically connected to a second output end of the controller (U2); the second light-emitting diode (LED2) being encapsulated into one piece with the first light-emitting diode (LED1); and cathode terminals of the first light-emitting diode (LED1) and the second light-emitting diode (LED2) being connected.

5. The power converter for the lamp according to claim 4, wherein the user command switch unit further comprises a microphone (MI) configured to acquire a user voice switch command;

the power converter further comprises:

an offline voice recognition unit (5) having an input end electrically connected to the microphone (MI); after directly parsing a voice switch command provided by the microphone (MI), the offline voice recognition unit (5) outputting a work mode control command matched with the input voice switch command; the controller (U2) being electrically connected to an output end of the offline voice recognition unit (5) to acquire the work mode control command; and the changeover switch (SW1) or the radio signal receiving module being further configured to switch between a manual control mode and a voice control mode.

6. The power converter for the lamp according to claim 5, wherein the offline voice recognition unit (5) comprises:

an offline voice recognition chip (U1) configured to parse the voice switch command and output a command signal, the offline voice recognition chip (U1) being electrically connected to the microphone (MI), and the offline voice recognition chip (U1) being inbuilt with a module configured to generate the work mode control command.

7. The power converter for a lamp of claim 4, wherein the work mode indication control signal output by the controller (2) is a coded signal, the multicolor light-emitting indicator lamp (1) is a coded light-emitting module, and the controller (U2) is electrically connected to the coded light-emitting module.

8. The power converter for a lamp of claim 7, wherein the coded light-emitting module comprises: a control chip configured to output a PWM signal according to a coded signal, the control chip being electrically connected to the controller (U2); and a light-emitting hybrid encapsulated component electrically connected to an output end of the control chip, the light-emitting hybrid encapsulated component being composed of multiple light-emitting diodes that emit different colors of light, and these light-emitting diodes being encapsulated into one piece with the control chip.

* * * * *